(12) United States Patent
Pejhan

(10) Patent No.: US 10,623,794 B2
(45) Date of Patent: Apr. 14, 2020

(54) DYNAMIC PLAYLIST CUSTOMIZATION BY ADAPTIVE STREAMING CLIENT

(71) Applicant: AT&T Intellectual Property I, L.P., Atlanta, GA (US)

(72) Inventor: Sassan Pejhan, Princeton, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

(21) Appl. No.: 15/828,496

(22) Filed: Dec. 1, 2017

(65) Prior Publication Data

US 2019/0174166 A1 Jun. 6, 2019

(51) Int. Cl.
| | |
|---|---|
| *H04N 21/262* | (2011.01) |
| *H04N 21/2343* | (2011.01) |
| *H04N 21/854* | (2011.01) |
| *H04N 21/482* | (2011.01) |
| *G06F 16/438* | (2019.01) |

(52) U.S. Cl.
CPC ... *H04N 21/26258* (2013.01); *G06F 16/4387* (2019.01); *H04N 21/2343* (2013.01); *H04N 21/4825* (2013.01); *H04N 21/85406* (2013.01)

(58) Field of Classification Search
None
See application file for complete search history.

(56) References Cited

U.S. PATENT DOCUMENTS

| | | | |
|---|---|---|---|
| 7,778,980 B2 | 8/2010 | Bodin et al. | |
| 8,028,038 B2 | 9/2011 | Weel | |
| 8,718,100 B2 | 5/2014 | Markley et al. | |
| 8,813,127 B2 | 8/2014 | Liu et al. | |
| 8,910,212 B2 | 12/2014 | Trimper et al. | |
| 8,990,408 B1 * | 3/2015 | Owen | H04L 67/303 709/227 |
| 9,256,602 B2 | 2/2016 | Stratton et al. | |
| 9,392,325 B2 | 7/2016 | Bangma et al. | |
| 9,438,946 B2 | 9/2016 | Hasek et al. | |
| 9,521,459 B2 | 12/2016 | Earle et al. | |
| 9,584,842 B2 | 2/2017 | Zhang | |
| 2002/0194260 A1 | 12/2002 | Headley et al. | |
| 2007/0113246 A1 | 5/2007 | Xiong et al. | |
| 2008/0098446 A1 | 4/2008 | Seckin et al. | |
| 2010/0162292 A1 * | 6/2010 | Potrebic | H04N 5/44543 725/27 |
| 2010/0199301 A1 * | 8/2010 | Hayashi | H04H 20/28 725/32 |
| 2010/0325086 A1 | 12/2010 | Skinner et al. | |

(Continued)

*Primary Examiner* — Michael R Telan

(74) *Attorney, Agent, or Firm* — Guntin & Gust, PLC; Jay H. Anderson

(57) ABSTRACT

Aspects of the subject disclosure may include, for example, a method comprising sending a first list of formats associated with media content to a client device via a network, and receiving from the client device a selection of a format from a second list of formats filtered from the first list using filtering criteria. The second list includes formats compatible with the client device. The filtering criteria can be based on performance metrics of the network and on capabilities of the client device. During presentation of the content at the client device in the selected format, transmission of the content item can be dynamically altered in response to a message that the presentation be continued in a different format. Other embodiments are disclosed.

20 Claims, 9 Drawing Sheets

(56) References Cited

U.S. PATENT DOCUMENTS

| | | |
|---|---|---|
| 2010/0325155 A1 | 12/2010 | Skinner et al. |
| 2012/0197897 A1 | 8/2012 | Knight et al. |
| 2013/0044996 A1* | 2/2013 | Bhogal ................... H04N 5/76 386/326 |
| 2015/0095940 A1 | 4/2015 | Redmann |
| 2015/0381690 A1* | 12/2015 | Schmidt ............. H04L 65/4069 709/231 |
| 2017/0055039 A1 | 2/2017 | Earle |

* cited by examiner

300

400

DYNAMIC PLAYLIST CUSTOMIZATION BY ADAPTIVE STREAMING CLIENT

FIELD OF THE DISCLOSURE

The subject disclosure relates to video streaming on a network, and more particularly to a system for customizing a playlist for a client to ensure that an item of content is played on a client device in the best available format.

BACKGROUND

Media content can be delivered over a network to client device(s) using adaptive bit rate (ABR) streaming. The format in which the content is best presented depends on several factors including performance of the network, configuration of the client device, and capabilities of the client device. These factors can change over time, and in particular can change during presentation of the content.

BRIEF DESCRIPTION OF THE DRAWINGS

Reference will now be made to the accompanying drawings, which are not necessarily drawn to scale, and wherein.

DETAILED DESCRIPTION

Figure 1:
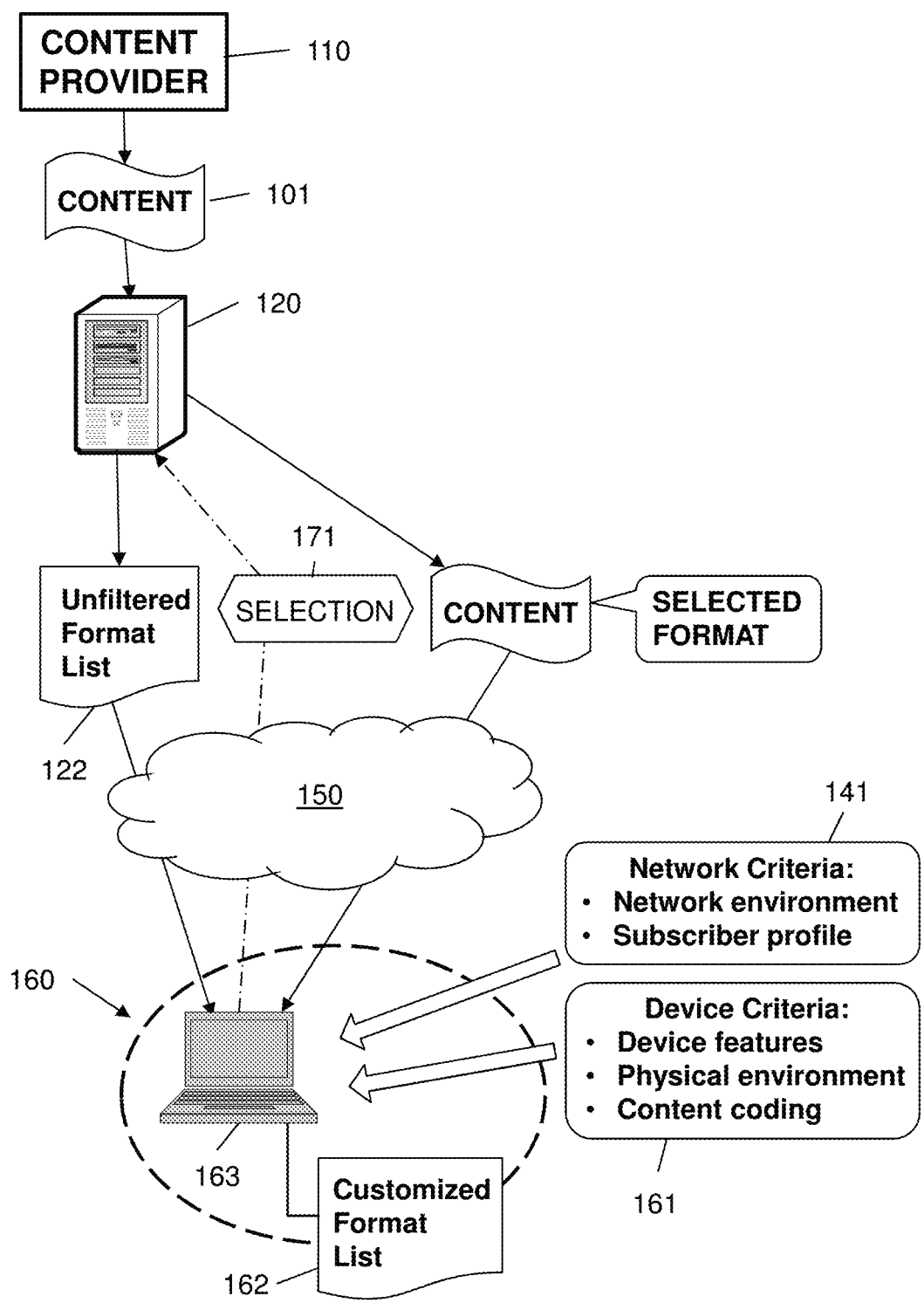
FIG. 1 schematically illustrates client-side filtering of a list of content formats, in accordance with embodiments of the disclosure.

The subject disclosure describes, among other things, illustrative embodiments for selecting a format in which an item of media content is to be presented at a client device communicating over a network, based on a list, generated by the client device, of appropriate formats for the media content. Other embodiments are described in the subject disclosure.

One or more aspects of the subject disclosure include a method comprising sending, by a processing system including a processor of a media service provider, a first list of formats associated with a media content item to a client device; the media service provider communicates with the client device over a network. The method also comprises receiving from the client device a selection of a format for presentation of the media content item; the selected format comprises an entry in a second list of formats generated by the client device in accordance with filtering of the first list of formats by the client device using filtering criteria. The filtering criteria are based at least in part on performance metrics of the network, a user profile, capabilities of the client device, a physical environment of the client device, or a combination thereof. The method further comprises transmitting the media content item in the selected format to the client device and, during the presentation of the media content item, dynamically altering transmission of the media content item to the client device in response to an indication from the client device that the presentation be continued in a new format different from the selected format.

One or more aspects of the subject disclosure include a device comprising a processing system including a processor of a media service provider, and a memory that stores executable instructions that, when executed by the processing system, facilitate performance of operations. The operations comprise sending a first list of formats associated with a media content item to a client device; the media service provider communicates with the client device over a network. The operations also comprise receiving from the client device a selection of a format for presentation of the media content item; the selected format comprises an entry in a second list of formats generated by the client device in accordance with filtering of the first list of formats by the client device using filtering criteria. The filtering criteria are based at least in part on performance metrics of the network, a user profile, capabilities of the client device, a physical environment of the client device, or a combination thereof. The operations further comprise receiving a notice from the client device identifying a default format different from the selected format, and transmitting the media content item in the selected format to the client device. The operations also comprise dynamically altering transmission of the media content item to the client device during the presentation of the media content item, in response to an indication from the client device that the presentation be continued in a new format different from the selected format.

One or more aspects of the subject disclosure include a non-transitory machine-readable medium comprising executable instructions that, when executed by a processing system including a processor, facilitate performance of operations. The operations comprise sending a first list of formats associated with a media content item to a client device via a network, and receiving from the client device a selection of a format for presentation of the media content item. The selected format comprises an entry in a second list of formats generated by the client device, in accordance with filtering of the first list of formats by the client device using filtering criteria. The filtering criteria are based at least in part on performance metrics of the network, a user profile, capabilities of the client device, a physical environment of the client device, or a combination thereof. The operations also comprise transmitting the media content item in the selected format to the client device and, during the presentation of the media content item, dynamically altering transmission of the media content item to the client device in response to an indication from the client device that the presentation be continued in a new format different from the selected format.

FIG. 1 schematically illustrates an embodiment 100 of the disclosure, in which a media service provider and a client device communicate over a network, and in which the client device selects a format for media content to be presented at the client device. In this embodiment, the media service provider can include a media streaming server 120 delivering media content 101 to the client device over network 150. Media content 101 is provided by a content provider system 110; in this embodiment, the content provider system 110 and the media streaming server 120 are different entities.

The media streaming server 120 maintains a list 122 of all the formats in which the content 101 can be presented. In general, the same item of content may be provided to the client device in any of multiple formats; the content may thus be available from streaming server 120 in multiple variants, each in a different format. List 122 may be viewed as an unfiltered list that includes all formats for the content 101 that exist on server 120.

When the client device 163 (operating in a client environment 160 and communicating with the service provider over network 150) requests content 101, the media streaming server 120 responds by sending the unfiltered format list 122 to the client device 163. Client device 163 then stores list 122 in a local storage device (not shown in FIG. 1).

The client device performs a filtering procedure to determine whether a format is appropriate for presentation of the content. In this embodiment, client device 163 is aware of network conditions, and can filter list 122 using criteria 141. Criteria 141 can include characteristics of the network 150 on which the client device operates, including network metrics (e.g. network traffic, available bandwidth), and a subscriber data plan associated with the client device. More generally, criteria 141 include criteria that are network-related but device-independent; that is, criteria 141 are independent of the configuration or capabilities of the client device.

The filtering procedure at the client device also includes filtering using device-related criteria 161. Criteria 161 can include features and configurations of client devices (in this embodiment, device 163 with various devices possibly connected thereto), features of the physical environment in which the device operates, codecs supported by the device, user preferences, etc. For instance, any format that has a spatial video resolution exceeding that of the device screen can be deemed inappropriate. As another instance, if the video is encoded in a format that the device does not support, it will again be deemed as inappropriate.

Based on the filtering using criteria 141-161, the client device 163 generates a customized list 162 of formats that are compatible with the client device. List 162 includes all of the formats for content 101 that are deemed appropriate by the client device for the current configuration and environment of the client device. In the filtering procedure, this determination is made for each entry on list 122; each entry may be viewed as a variant of the content in the listed format.

The client device selects a format for presentation of the content from list 162, and transmits the selection 171 to the streaming server 120. The client device can then obtain the content in the selected format.

In another embodiment, the client device 163 can also select a default format from list 162 for receiving the content 101, and transmit this selection to the streaming server 120. The default format can be used to provide the content if a fault occurs in transmitting the content in the selected format. The default format can be used until the client device makes another selection.

Some additional examples of criteria 161 that can be applied in generating the customized format list 162 are as follows:

(a) Data usage, according to the type of network (for example, cellular vs. Wi-Fi) and data plan (for example, capped vs. uncapped): The client may decide to not include high bit-rate variants in list 162 if, for example, the client is on a cellular network and has a data cap, even if the client is able to play back those high bit-rate variants.

(b) Type of display device: The client device can be a smartphone or tablet that uses its own display, or alternatively be connected to a much larger display (for example, a 4K television) with greater capabilities.

(c) Display device capabilities: The display device capabilities can impact display resolution, display dynamic range (for example, High Dynamic Range vs. Standard Dynamic Range), and display color gamut (for example, a wide color gamut vs. a standard color gamut). If, for example, content is to be presented on a smartphone with a small screen, HD resolution, and standard dynamic range, operating according to ITU-R Recommendation BT.709 (Rec709), list 162 may include one set of formats, but if the smartphone is connected to a 4K, high dynamic range television operating according to ITU-R Recommendation BT.2020 (Rec 2020), list 162 may include a different set of formats.

(d) Type of audio output device: The client device (e.g. television or smartphone) may use its own speakers; alternatively, the client device may be connected to a surround sound system or to headphones capable of rendering immersive audio.

(e) Supported coding schemes: Some variants may be encoded using older standards (such as MPEG-2 video and Mp3 audio) while other variants may be encoded using newer standards such as HEVC or E-AC3. In an embodiment, the client device may not itself support the newer codecs, but when connected to a smart TV may be able to pass through those variants using the newer codec to the smart TV.

(f) Battery status: In another embodiment, a smartphone may support the newer codecs but, because its battery resources are limited, will use the older codecs which use fewer CPU cycles (for example, when on a Wi-Fi network with adequate bandwidth). In a further embodiment, the client device may use lower resolution and/or lower bit-rate variants to save battery power.

(g) Content provider fees/charges: A content provider may charge a premium for the 4K version and/or the HDR version of the content. If so, the user may not want to pay the higher fees, and filter the variants accordingly.

(h) Physical environment: In addition to its environment regarding device type, network connectivity, and/or network usage, the client can be aware of its physical environment (e.g. light level, noise level, etc.) and construct a customized format list for delivering the content in that environment.

Figure 2:
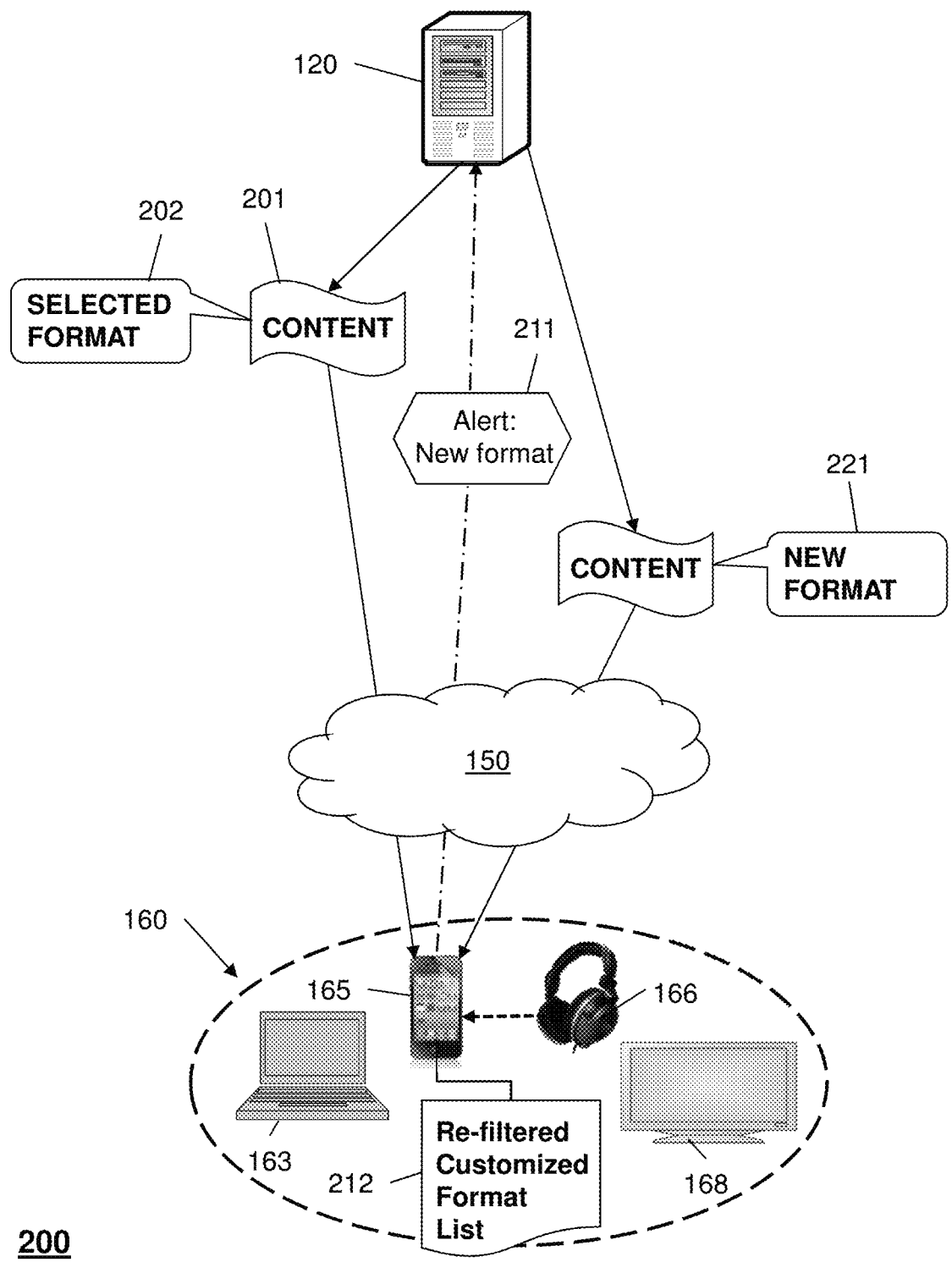
FIG. 2 schematically illustrates dynamically altering a content format, in accordance with embodiments of the disclosure.

FIG. 2 schematically illustrates a system 200 in which a content format is dynamically altered, in accordance with embodiments of the disclosure. As shown in FIG. 2, the client device environment 160 includes several different devices (desktop computer 163, smartphone 165, headphones 166, television 168) that can be connected in various configurations. In this embodiment, streaming server 120 provides content 201, in a format 202 previously selected by the client, to smartphone 165.

If the client environment changes during the presentation (for example, the client is a mobile device moving into an area covered by a different network, the user connects headphones 166 to the smartphone 165, the battery of smartphone 165 is re-charged, etc.), the client can generate a new customized format list 212 by re-filtering the stored format list 122. The client can then select a new format for the content, and send the service provider a message 211 that the presentation of the content is to be continued in the new format 221. In this embodiment, the client may also select a new default format, in addition to selecting a new format for continuing the presentation.

It will be appreciated that in embodiments of the disclosure, content can be delivered by adaptive streaming applications in a format selected by the client, where the client is network-aware as well as aware of its own capabilities. Furthermore, the list of appropriate formats can be dynamically changed during presentation of the content.

Figure 3:
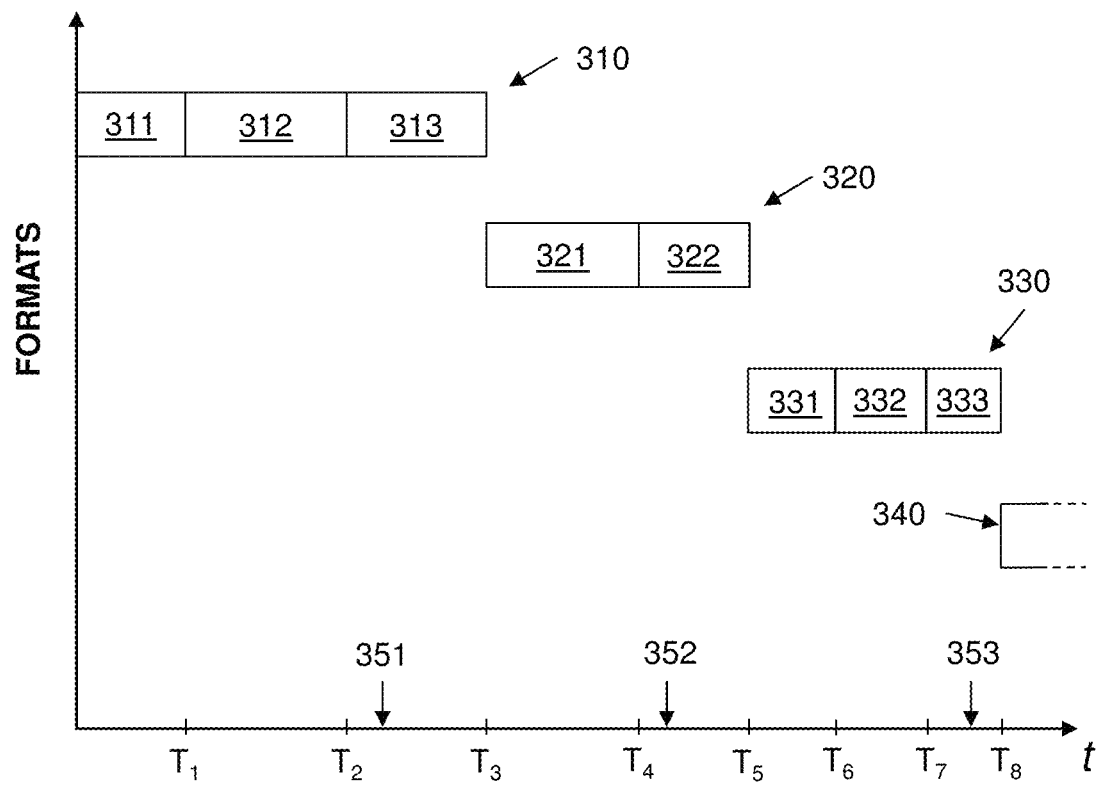
FIG. 3 is a timing chart depicting an illustrative embodiment of content presentation with changing formats.

FIG. 3 is a timing chart depicting an illustrative embodiment of content presentation with dynamically changing formats. As shown in FIG. 3, content to be presented by the client (e.g. content 201 in FIG. 2) is segmented into chunks, with each chunk having a duration typically 4-10 seconds. The chunk boundaries are aligned across all formats, thereby providing switching points between formats as the client environment 160 varies and the client accordingly sends new alert messages 211 during the presentation.

In this embodiment, the content is initially presented using format 310; chunks 311-313 are delivered, ending at times $T_1$-$T_3$ respectively. An event occurs at time 351 (e.g. a bandwidth change), in response to which the client selects a new format 320. When delivery of the current chunk 313 concludes, the presentation continues with the new format 320. Chunks 321-322 are delivered in this format, ending at times $T_4$, $T_5$ respectively. Another event occurs at time 352 (e.g. a change in device configuration), in response to which the client selects a new format 330. When delivery of the current chunk 322 concludes, the presentation continues with the new format 330. Chunks 331-333 are delivered in this format, ending at times $T_6$-$T_8$ respectively. An additional event occurs at time 353 (e.g. a change in physical environment), in response to which the client selects a new format 340. Chunks in format 340 are delivered beginning at time $T_8$.

Figure 4:
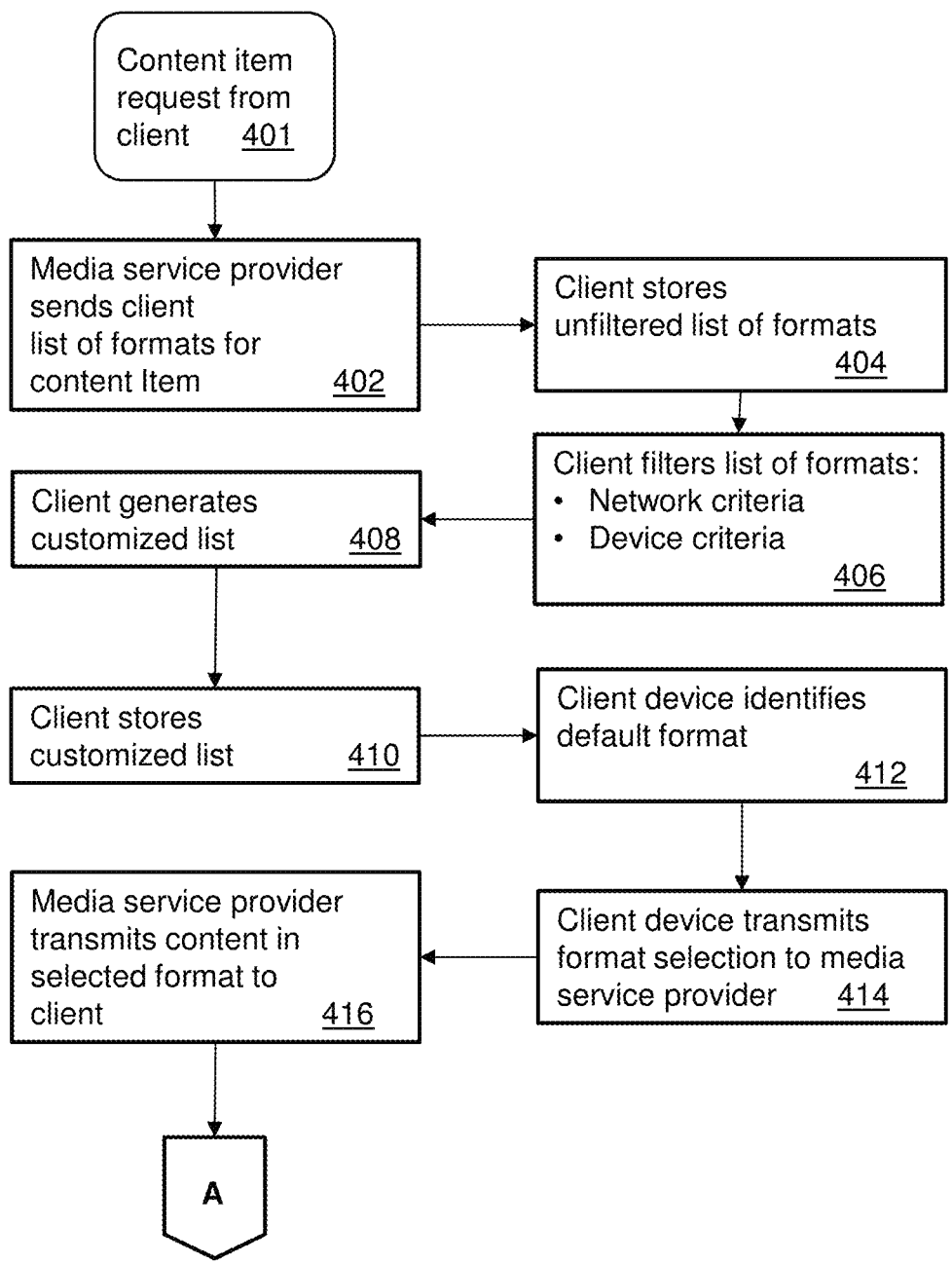
FIGS. 4-5 are connected flowcharts depicting an illustrative embodiment of a method used in portions of the system described in FIGS. 1-2.
Figure 5:
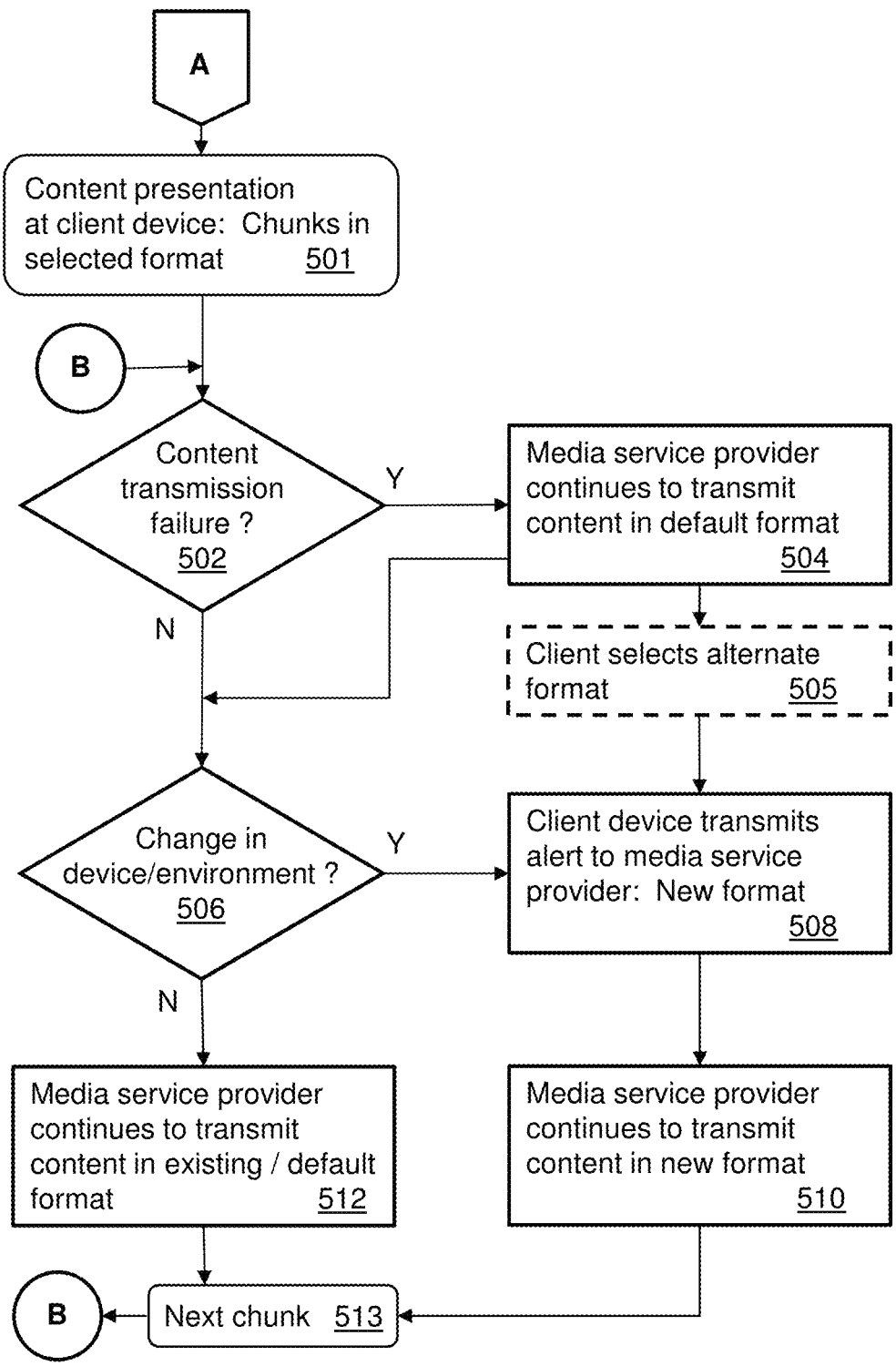

FIGS. 4-5 are connected flowcharts depicting an illustrative embodiment of a method used by systems 100-200. In response to a request 401 from the client, the streaming server associated with the media service provider sends an unfiltered list of formats to the media service provider (step 402); this list includes all formats in which the content exists on the streaming server. The client stores the unfiltered list (step 404) at a storage device local to the client device.

The client device performs a filtering procedure using network-related and device-related criteria (step 406) to generate a list of formats customized for the client (step 408). The client stores the customized list (step 410). In this embodiment, the client device also identifies a default format for providing the content (step 412).

The client device then transmits a selection of a format from the customized list to the media streaming server (step 414). The media streaming server proceeds to transmit the content in the selected format to the client device (step 416).

The content presentation 501 by the client device comprises a series of chunks in the selected format, transmitted by the media streaming server. If a fault occurs in the transmission of the content (step 502), the media streaming server can switch to the default format and continue with the presentation in that format (step 504). Otherwise, the presentation continues in the selected format. During the presentation, if a change occurs (step 506) in the client environment (e.g. a bandwidth or network change, a change in client device configuration, a change in physical environment, etc.), the client device can select a new format and transmit a message to the media streaming server, alerting the media streaming server of that selection (step 508). The media streaming server then continues to transmit chunks of content in the new format (step 510). If a new format is not selected, the media streaming server continues to transmit chunks in the existing format, which may be the default format (step 512).

In an embodiment, the default format is used only until the client selects another format (step 505). The client then transmits a message to the media streaming server, alerting the media streaming server of that selection. Presentation in the selected alternate format can then begin with the next chunk 513.

While for purposes of simplicity of explanation, the respective processes are shown and described as a series of blocks in FIGS. 4-5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 6:
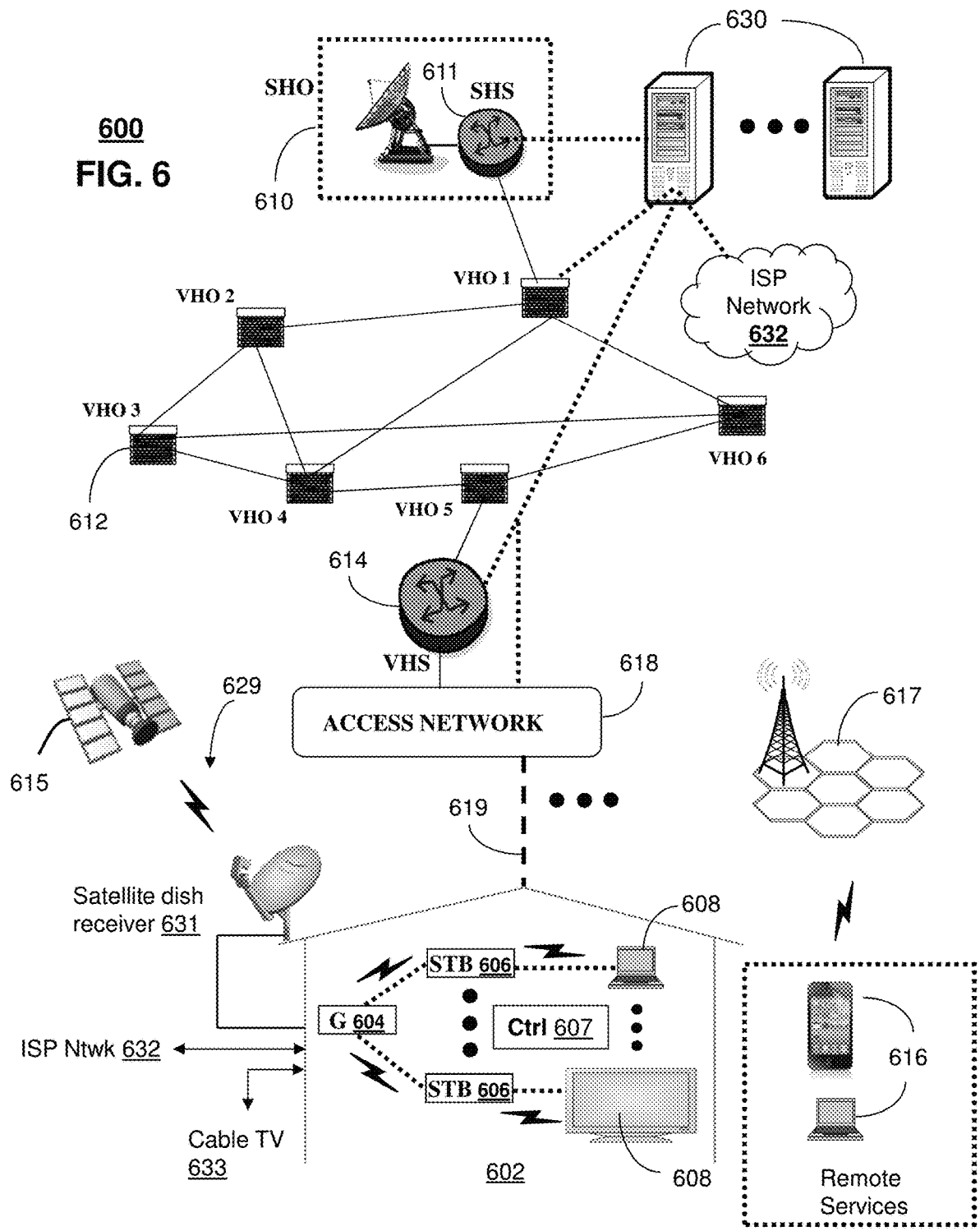
FIGS. 6-7 depict illustrative embodiments of communication systems that provide media services to client devices shown in FIGS. 1-2.

FIG. 6 depicts an illustrative embodiment of a communication system 600 for providing various communication services, such as delivering media content. The communication system 600 can represent an interactive media network, such as an interactive television system (e.g., an Internet Protocol Television (IPTV) media system). Communication system 600 can be overlaid or operably coupled with systems 100-200 of FIGS. 1 and/or 2 as another representative embodiment of communication system 600. For instance, one or more devices illustrated in the communication system 600 of FIG. 6 can comprise a processing system including a processor of a media service provider, and a memory that stores executable instructions that, when executed by the processing system, facilitate performance of operations. The operations can comprise sending a first list of formats associated with a media content item to a client device that communicates with the media service provider device over a network. The operations can also comprise receiving from the client device a selection of a format for presentation of the media content item; the selected format can comprise an entry in a second list of formats generated by the client device in accordance with filtering of the first list of formats by the client device using filtering criteria. The filtering criteria can be based at least in part on performance metrics of the network, a user profile, capabilities of the client device, a physical environment of the client device, or a combination thereof. The operations can further comprise receiving a notice from the client device identifying a default format different from the selected format, and transmitting the media content item in the selected format to the client device. The operations can also comprise dynamically altering transmission of the media content item to the client device during the presentation of the media content item, in response to an indication from the client device that the presentation be continued in a new format different from the selected format.

In one or more embodiments, the communication system 600 can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol. The VHS 614 can distribute multimedia broadcast content via an access network 618 to commercial and/or residential buildings 602 housing a gateway 604 (such as a residential or commercial gateway).

The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee® or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services. System 600 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as a server (herein referred to as server 630). The server 630 can use computing and communication technology to perform filtering of the lists of media content presentation formats, which can include, among other things, the techniques in methods 400-500 of FIGS. 4-5. For instance, functions of server 630 can be similar to the functions described for media streaming server 120 of FIG. 1 in accordance with methods 400-500. The media processors 606 and wireless communication devices 616 can be provisioned with software functions to utilize the services of server 630. For instance, functions of media processors 606 and wireless communication devices 616 can be similar to the functions described <for the communication devices 165 of FIG. 2 in accordance with methods 400-500.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
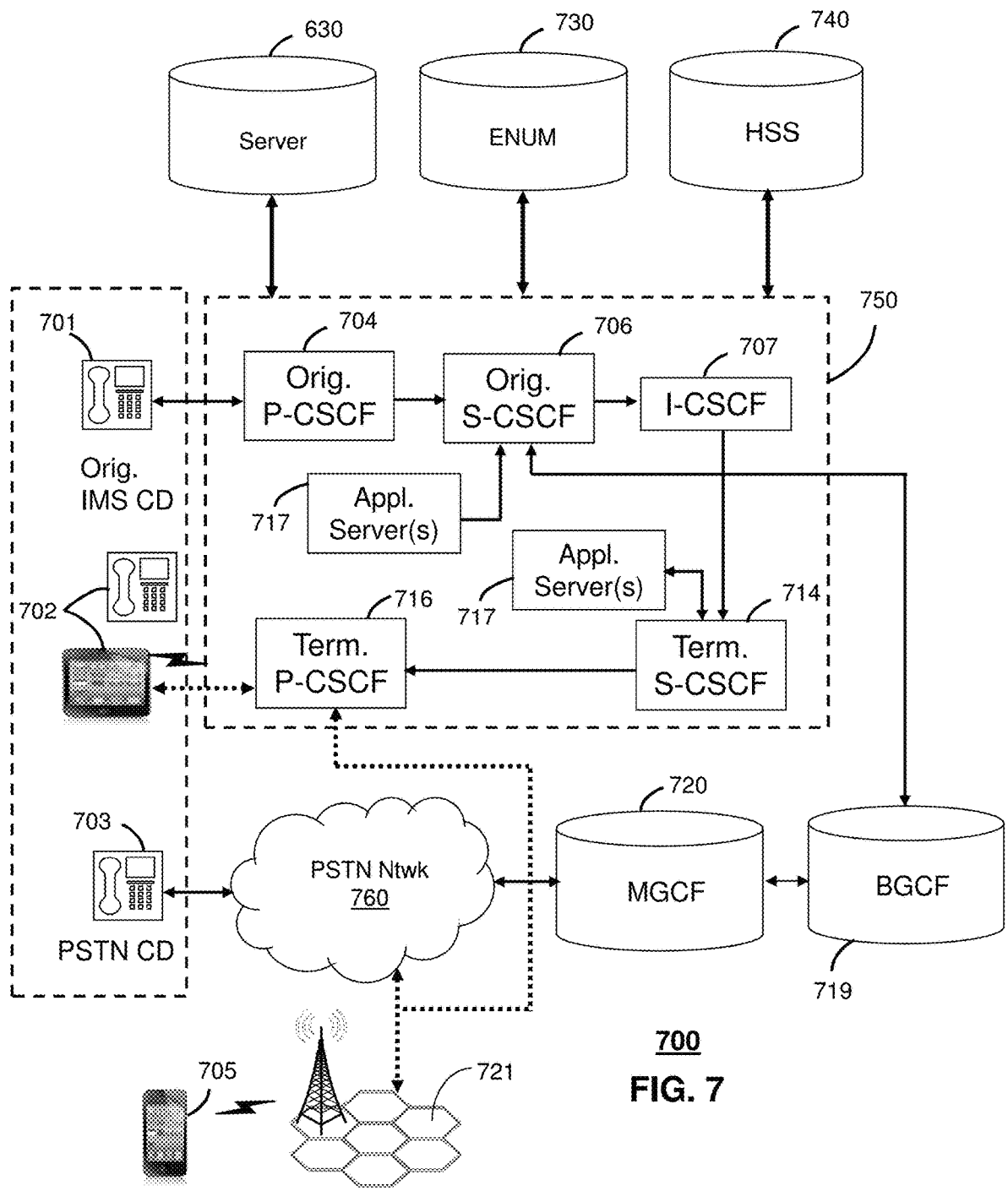

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with systems 100-200 of FIGS. 1 and/or 2 and communication system 600 as another representative embodiment of communication system 600. In particular, communication system 600 can be configured to perform a method comprising sending, by a processing system including a processor of a media service provider, a first list of formats associated with a media content item to a client device, where the media service provider communicates with the client device over a network. The method can also comprise receiving from the client device a selection of a format for presentation of the media content item; the selected format can comprise an entry in a second list of formats generated by the client device in accordance with filtering of the first list of formats by the client device using filtering criteria. The filtering criteria can be based at least in part on performance metrics of the network, a user profile, capabilities of the client device, a physical environment of the client device, or a combination thereof. The method can further comprise transmitting the media content item in the selected format to the client device and, during the presentation of the media content item, dynamically altering transmission of the media content item to the client device in response to an indication from the client device that the presentation be continued in a new format different from the selected format.

Communication system 700 can comprise a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 630 of FIG. 6 can be operably coupled to communication system 700 for purposes similar to those described above. Server 630 can provide services to the CDs 701, 702, 703 and 705 of FIG. 7, which can be adapted with software to utilize the services of the server 630. Server 630 can be an integral part of the application server(s) 717, which can be adapted to the operations of the IMS network 750.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 8:
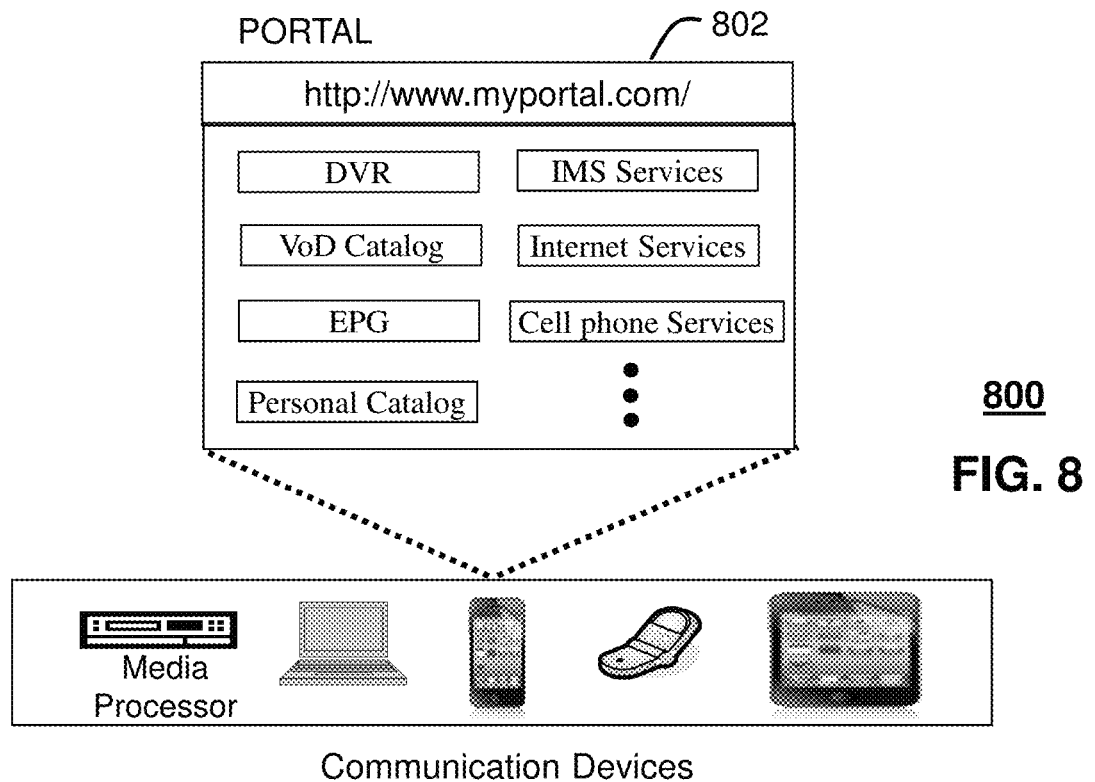
FIG. 8 depicts an illustrative embodiment of a web portal for interacting with the communication systems of FIGS. 6-7.

FIG. 8 depicts an illustrative embodiment of a web portal 802 of a communication system 800. Communication system 800 can be overlaid or operably coupled with systems 100-200 of FIGS. 1 and/or 2, communication system 600, and/or communication system 700 as another representative embodiment of systems 100-200 of FIGS. 1 and/or 2, communication system 600, and/or communication system 700. The web portal 802 can be used for managing services of systems 100-200 of FIGS. 1 and/or 2 and communication systems 600-700. A web page of the web portal 802 can be accessed by a Uniform Resource Locator (URL) with an Internet browser using an Internet-capable communication device such as those described in FIGS. 1 and/or 2 and FIGS. 6-7. The web portal 802 can be configured, for example, to access a media processor 606 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 802 can also be used for provisioning IMS services described earlier, provisioning Internet services, provisioning cellular phone services, and so on.

The web portal 802 can further be utilized to manage and provision software applications to adapt these applications as may be desired by subscribers and/or service providers of systems 100-200 of FIGS. 1 and/or 2, and communication systems 600-700. For instance, users of the services provided by server 120 or server 630 can log into their on-line accounts and provision the server 120 or server 630 with filtering criteria and software for communicating with client devices described in FIGS. 1-7, and so on. Service providers can log onto an administrator account to provision, monitor and/or maintain the systems 100-200 of FIGS. 1 and/or 2 or server 630.

Figure 9:
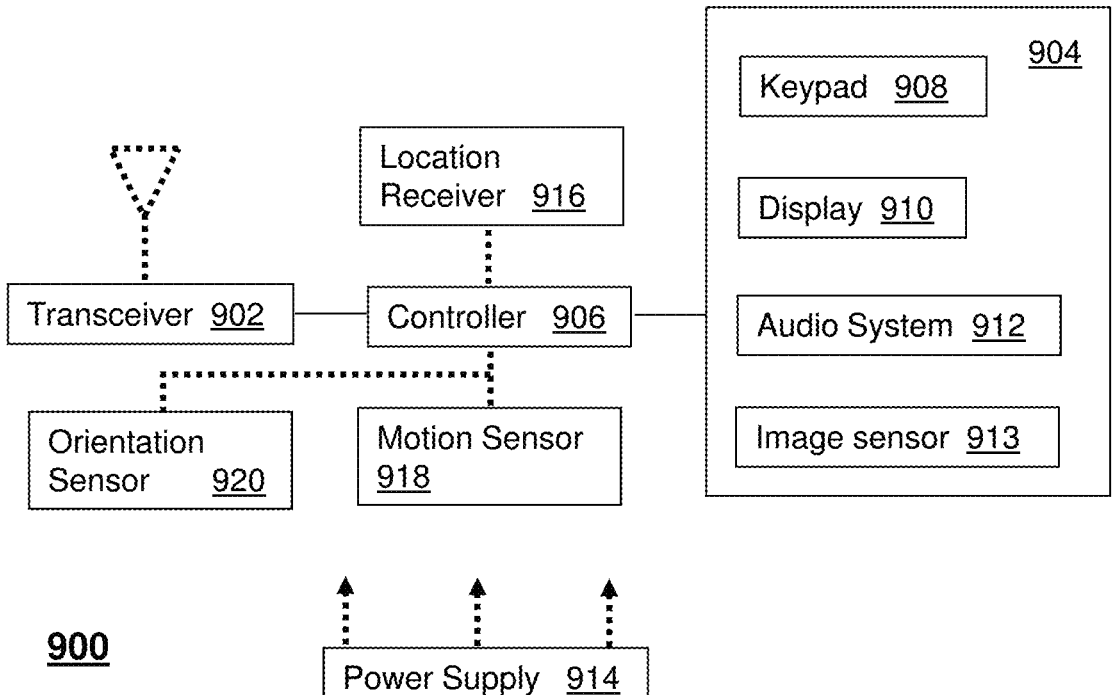
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1 and/or 2 and FIGS. 6-7, and can be configured to perform portions of methods 400-500 of FIGS. 4-5.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of devices of FIGS. 1 and/or 2, the media processor 606, the media devices 608, or the portable communication devices 616 of FIG. 6, as well as the IMS CDs 701-702 and PSTN CDs 703-705 of FIG. 7. It will be appreciated that the communication device 900 can also represent other devices that can operate in systems of FIGS. 1 and/or 2, communication systems 600-700 of FIGS. 6-7 such as a gaming console and a media player.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
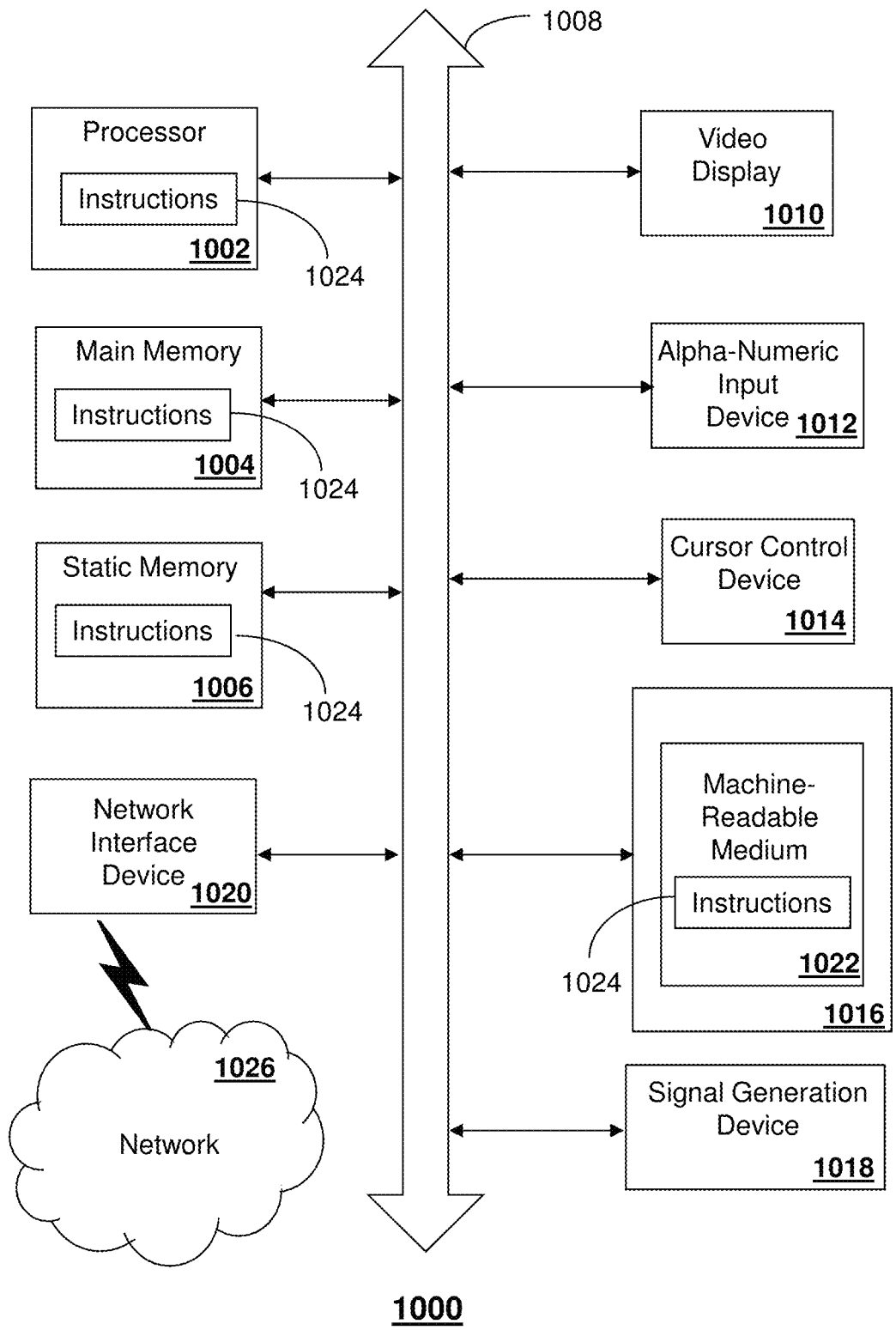
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the server 630, the media processor 606, the media streaming server 120, the client devices 163,165, and other devices of FIGS. 1-2. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
sending, by a processing system including a processor of a media service provider, a first list of formats associated with a media content item to a client device, wherein the media service provider communicates with the client device over a network;
receiving, by the processing system, from the client device a selection of a format for presentation of the media content item, the selected format comprising a first entry in a second list of formats generated by the client device in accordance with a first filtering of the first list of formats by the client device using filtering criteria, the filtering criteria based at least in part on performance metrics of the network, a user profile, capabilities of the client device, a physical environment of the client device, or a combination thereof;
transmitting, by the processing system, the media content item in the selected format to the client device;
receiving, by the processing system, from the client device a notice identifying a default format comprising a second entry in the second list of formats and different from the selected format;
responsive to a failure of transmission of the media content item during the presentation of the media content item, transmitting, by the processing system, the media content item in the default format; and
dynamically altering, by the processing system during the presentation of the media content item, transmission of the media content item to the client device in response to an indication from the client device that the presentation be continued in a new format different from the selected format,
wherein the media content item comprises a plurality of chunks, wherein the new format is selected from a third list of formats generated by the client device responsive to a change in environment of the client device during transmission of a chunk of the plurality of chunks, and wherein the media content item is transmitted in the new format beginning with a next succeeding chunk of the plurality of chunks.

2. The method of claim 1, further comprising obtaining, by the processing system, the media content item from equipment of a content provider, wherein the media service provider and the content provider are different entities.

3. The method of claim 1, wherein the third list of formats is generated in accordance with a second filtering of the first list of formats by the client device.

4. The method of claim 1, wherein the transmission of the media content item is dynamically altered from the selected format or the new format to the default format during the presentation of the media content item.

5. The method of claim 1, wherein the change in environment of the client device comprises a change in a physical environment of the client device.

6. The method of claim 1, wherein the change in environment of the client device comprises a change in the network, a change in bandwidth of the transmission of the media content item, a change in a configuration of the client device, or a combination thereof.

7. The method of claim 1, wherein the filtering criteria comprise a coding scheme for the media content item.

8. The method of claim 1, further comprising:
receiving, by the processing system, a selection of an alternate format, wherein the client device selects the alternate format responsive to initiation of the transmitting in the default format; and
transmitting, by the processing system, the media content item in the alternate format.

9. The method of claim 1, wherein the media content item comprises a video portion presented at a display device associated with the client device, and wherein the filtering criteria comprise a type of the display device, a resolution of the display device, a dynamic range of the display device, or a combination thereof.

10. The method of claim 1, wherein the media content item comprises an audio portion presented at an audio output device associated with the client device, and wherein the filtering criteria comprise a type of the audio output device.

11. A device comprising:
a processing system including a processor of a media service provider; and
a memory that stores executable instructions that, when executed by the processing system, facilitate performance of operations comprising:
sending a first list of formats associated with a media content item to a client device, wherein the media service provider communicates with the client device over a network;
receiving from the client device a selection of a format for presentation of the media content item, the selected format comprising a first entry in a second list of formats generated by the client device in accordance with a first filtering of the first list of formats by the client device using filtering criteria, the filtering criteria based at least in part on performance metrics of the network, a user profile, capabilities of the client device, a physical environment of the client device, or a combination thereof;
receiving a notice from the client device identifying a default format comprising a second entry in the second list of formats and different from the selected format;
transmitting the media content item in the selected format to the client device;
responsive to a failure of transmission of the media content item during the presentation of the media content item, transmitting the media content item in the default format; and
during the presentation of the media content item, dynamically altering transmission of the media content item to the client device in response to an indication from the client device that the presentation be continued in a new format different from the selected format,
wherein the media content item comprises a plurality of chunks, wherein the new format is selected from a third list of formats generated by the client device responsive to a change in environment of the client device during transmission of a chunk of the plurality of chunks, and wherein the media content item is transmitted in the new format beginning with a next succeeding chunk of the plurality of chunks.

12. The device of claim 11, wherein the filtering criteria comprise a coding scheme for the media content item.

13. The device of claim 11, wherein the media content item comprises a video portion presented at a display device associated with the client device, and wherein the filtering criteria comprise a type of the display device, a resolution of the display device, a dynamic range of the display device, or a combination thereof.

14. The device of claim 11, wherein the media content item comprises an audio portion presented at an audio output device associated with the client device, and wherein the filtering criteria comprise a type of the audio output device.

15. The device of claim 11, wherein the third list of formats is generated in accordance with a second filtering of the first list of formats by the client device.

16. A non-transitory machine-readable medium comprising executable instructions that, when executed by a processing system including a processor, facilitate performance of operations comprising:
sending a first list of formats associated with a media content item to a client device via a network;
receiving from the client device a selection of a format for presentation of the media content item, the selected format comprising a first entry in a second list of formats generated by the client device in accordance with a first filtering of the first list of formats by the client device using filtering criteria, the filtering criteria based at least in part on performance metrics of the network, a user profile, capabilities of the client device, a physical environment of the client device, or a combination thereof;
transmitting the media content item in the selected format to the client device;
receiving from the client device a notice identifying a default format comprising a second entry in the second list of formats and different from the selected format;
responsive to a failure of transmission of the media content item during the presentation of the media content item, transmitting the media content item in the default format; and
during the presentation of the media content item, dynamically altering transmission of the media content item to the client device in response to an indication from the client device that the presentation be continued in a new format different from the selected format, wherein the media content item comprises a plurality of chunks, wherein the new format is selected from a third list of formats generated by the client device responsive to a change in environment of the client device during transmission of a chunk of the plurality of chunks, and wherein the media content item is transmitted in the new format beginning with a next succeeding chunk of the plurality of chunks.

17. The non-transitory machine-readable medium of claim 16, wherein the media content item comprises a video portion presented at a display device associated with the client device, and wherein the filtering criteria comprise a type of the display device, a resolution of the display device, a dynamic range of the display device, or a combination thereof.

18. The non-transitory machine-readable medium of claim 16, wherein the filtering criteria comprise a coding scheme for the media content item.

19. The non-transitory machine-readable medium of claim 16, wherein the third list of formats is generated in accordance with a second filtering of the first list of formats by the client device.

20. The non-transitory machine-readable medium of claim 19, wherein the change in environment of the client device comprises a change in the network, a change in bandwidth of the transmission of the media content item, a change in a configuration of the client device, or a combination thereof.

* * * * *